(12) United States Patent
Subbunarayanan et al.

(10) Patent No.: US 11,394,668 B1
(45) Date of Patent: Jul. 19, 2022

(54) SYSTEM AND METHOD FOR EXECUTING OPERATIONS IN A PERFORMANCE ENGINEERING ENVIRONMENT

(71) Applicant: The Toronto-Dominion Bank, Toronto (CA)

(72) Inventors: Periyakaruppan Subbunarayanan, Mississauga (CA); Harmanjit Singh, Mississauga (CA); Aayush Kathuria, Brampton (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/248,461

(22) Filed: Jan. 26, 2021

(51) Int. Cl.
| | |
|---|---|
| *H04L 51/02* | (2022.01) |
| *G06N 20/00* | (2019.01) |
| *H04L 43/08* | (2022.01) |
| *G06F 3/0481* | (2022.01) |
| *G06F 40/40* | (2020.01) |
| *G06F 9/54* | (2006.01) |

(52) U.S. Cl.
CPC ............ *H04L 51/02* (2013.01); *G06F 3/0481* (2013.01); *G06F 9/54* (2013.01); *G06F 40/40* (2020.01); *G06N 20/00* (2019.01); *H04L 43/08* (2013.01)

(58) Field of Classification Search
CPC ......... H04L 51/02; H04L 43/08; G06N 20/00; G06F 40/40; G06F 3/0481; G06F 9/54
See application file for complete search history.

(56) References Cited

U.S. PATENT DOCUMENTS

| | | | |
|---|---|---|---|
| 8,601,436 B2 | 12/2013 | Park et al. | |
| 9,038,026 B2 | 5/2015 | Chandra et al. | |
| 10,088,972 B2 | 10/2018 | Brown et al. | |
| 10,268,571 B2 | 4/2019 | Kulkarni et al. | |
| 10,357,881 B2 | 7/2019 | Faridi et al. | |
| 10,469,418 B2 | 11/2019 | Willshire | |
| 10,474,561 B2 | 11/2019 | Bhojan | |
| 10,629,191 B1 | 4/2020 | Cheng et al. | |
| 10,645,034 B2 | 5/2020 | Lalji et al. | |
| 2019/0311036 A1* | 10/2019 | Shanmugam | ........... H04L 51/02 |
| 2020/0160458 A1* | 5/2020 | Bodin | ...................... G06F 40/30 |
| 2020/0167134 A1* | 5/2020 | Dey | ......................... G06F 8/65 |
| 2020/0241872 A1* | 7/2020 | Muddakkagari | ........ G06F 40/14 |

(Continued)

*Primary Examiner* — Beau D Spratt
(74) *Attorney, Agent, or Firm* — CPST Intellectual Property Inc.; Brett J. Slaney

(57) ABSTRACT

A system and method are provided for executing operations in a performance engineering environment. The method includes receiving a request to implement a task within the environment, from an input to a conversational chat user interface; communicating with a logic system to determine an intent from the request; determining one or more executable instructions to implement one or more operations associated with the task, based on the determined intent; and communicating via the communications module, with at least one endpoint to trigger execution of the one or more operations using the one or more executable instructions; receiving via the communications module, data from the at least one endpoint, the data associated with execution of the one or more operations; generating a conversational response to the request based on or including the data received from the at least one endpoint; and having the conversational response rendered in the chat user interface.

20 Claims, 11 Drawing Sheets

(56) References Cited

U.S. PATENT DOCUMENTS

2020/0371755 A1* 11/2020 Patni .......................... G06F 8/34
2021/0064932 A1* 3/2021 Wang ................... G06K 9/6262
2021/0073474 A1* 3/2021 Sengupta ................ H04L 51/02

* cited by examiner

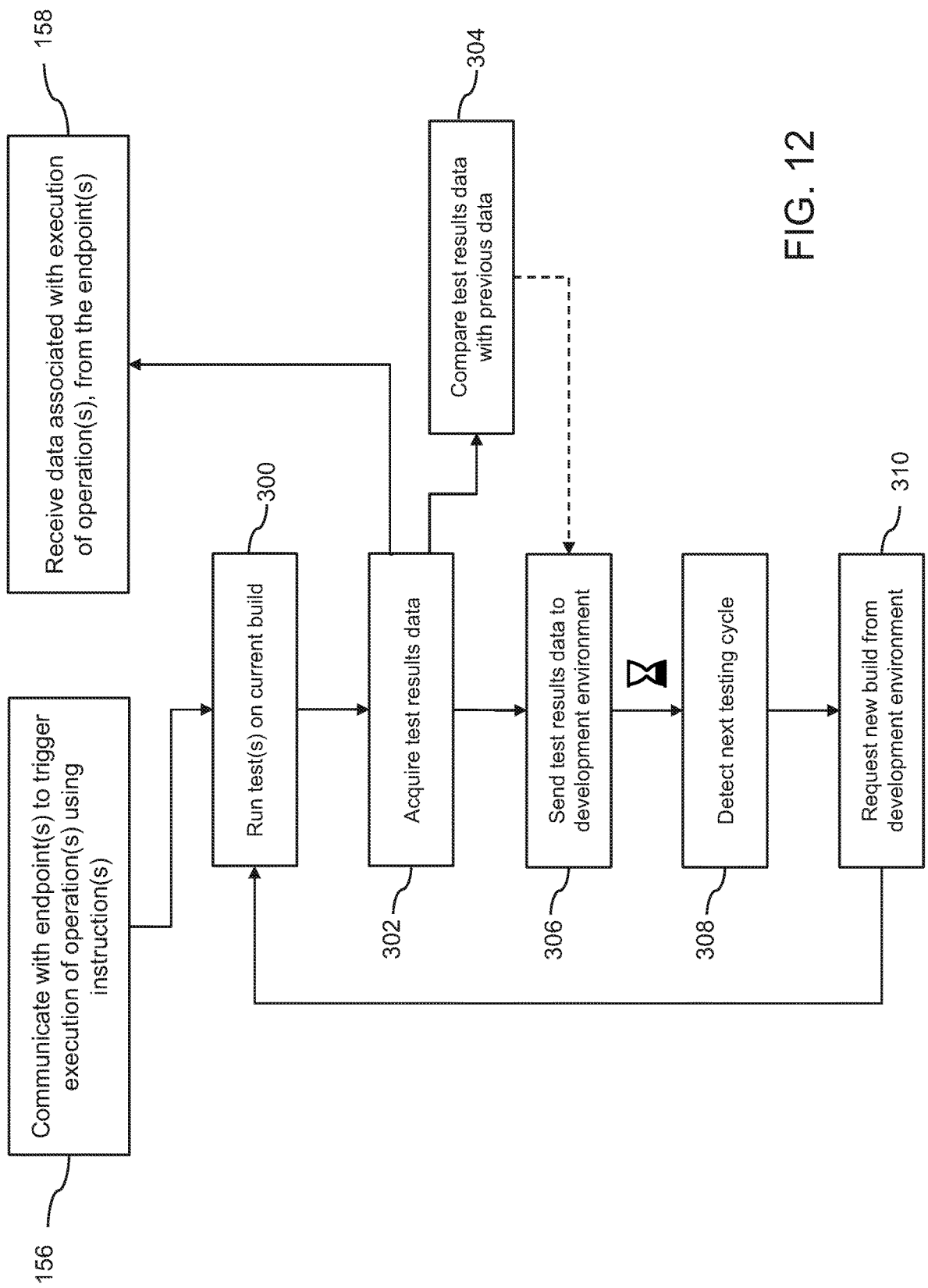

SYSTEM AND METHOD FOR EXECUTING OPERATIONS IN A PERFORMANCE ENGINEERING ENVIRONMENT

TECHNICAL FIELD

The following relates generally to executing operations in a performance engineering environment, such as in an application testing and/or application development environment.

BACKGROUND

As the number of mobile users increases, so too does the importance of measuring performance metrics on mobile devices. For example, it is found that users expect applications (also referred to herein as "apps") to load within a short amount of time, e.g., about two seconds. Because of this, some feel that native app load times should be as fast as possible. Additionally, poor app performance can impact an organization in other ways, for example, by increasing the number of technical service requests or calls, as well as negatively impacting ratings or rankings in application marketplaces (e.g., app stores), or more generally reviews or reputation. These negative impacts can also impact customer retention and uptake, particularly for younger generations who value their ability to perform many tasks remotely and with mobility.

Mobile performance testing typically measures key performance indicators (KPIs) from three perspectives, namely the end-user perspective, the network perspective, and the server perspective. The end-user perspective looks at installation, launch, transition, navigation, and uninstallation processes. The network perspective looks at network performance on different network types. The server perspective looks at transaction response times, throughput, bandwidth, and latency. This type of testing is performed in order to identify root causes of application performance bottlenecks to fix performance issues, lower the risk of deploying systems that do not meet business requirements, reduce hardware and software costs by improving overall system performance, and support individual, project-based testing and centers of excellence.

In addition to the above technical challenges, performance engineers are typically faced with several different testing and monitoring platforms and often require specialized knowledge or training in order to use the platforms and associated applications. This can limit the persons that are able to execute performance engineering tasks involved in implementing application testing and application development. For example, performance engineering tasks can include interacting with various systems to load builds, initiate and execute tests, gather test results, analyze test results, and package or provide the results to interested parties. However, these various tasks may require access to several different systems and can require a technical understanding of how these systems work and what output they provide. Moreover, many performance engineering tasks such as data gathering, and data analyses, can include significant manual efforts, consuming additional time and effort. With several systems being used, it can also be difficult for a single user to manage all of the tasks required.

BRIEF DESCRIPTION OF THE DRAWINGS

Embodiments will now be described with reference to the appended drawings wherein:

FIG. 12 is a flow diagram of an example of computer executable instructions for initiating periodic testing based on acquiring a latest build for an application.

DETAILED DESCRIPTION

Figure 1:
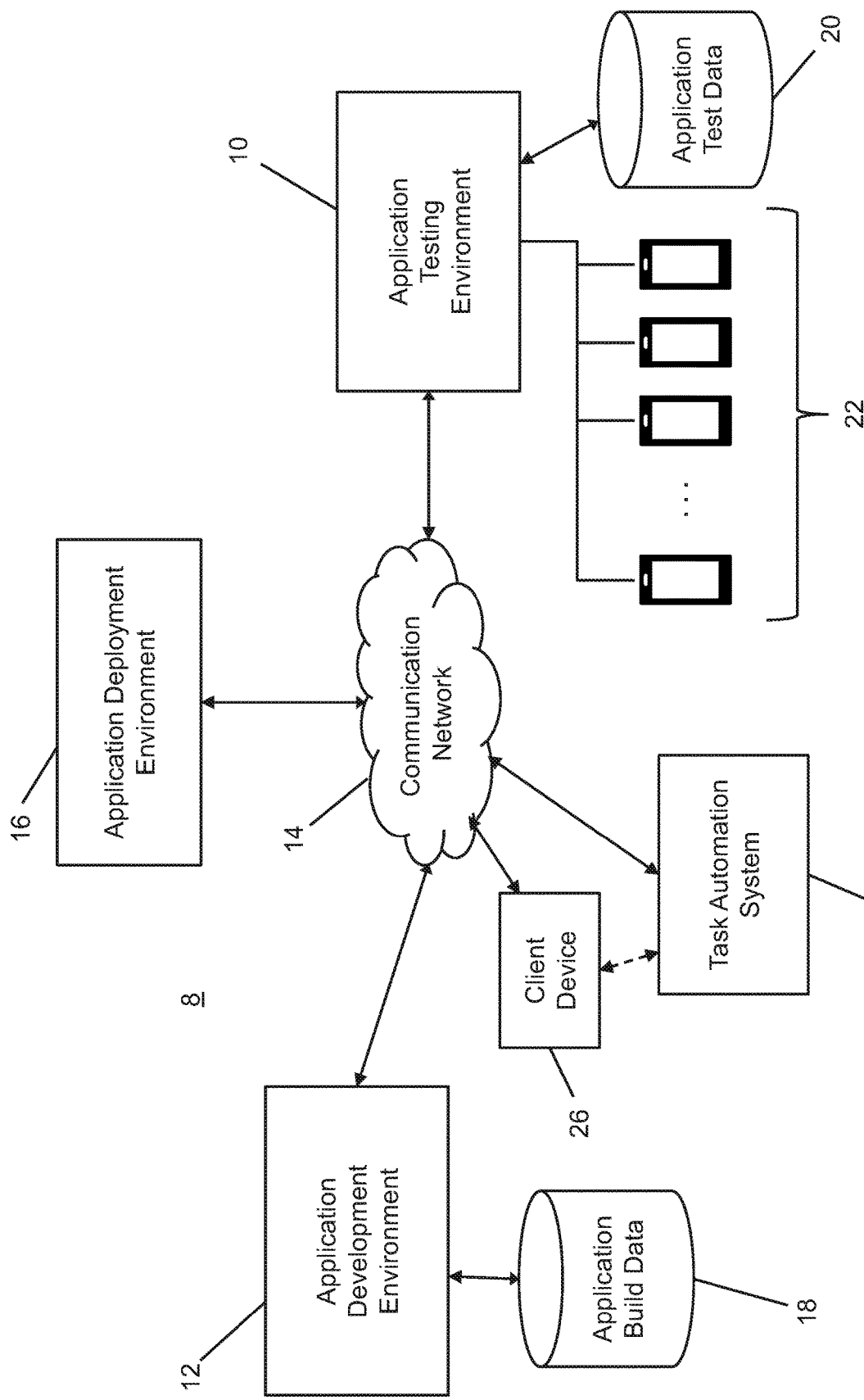
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

The following generally relates to a task automation system that can be integrated with or within a performance engineering environment such as a computing environment which includes an application testing environment and/or an application development environment to enable operations and instructions to be requested and executed using a conversational chat user interface (UI) to simplify the interactions with such an environment as well as simplify the gathering and consumption of data generated through performance engineering tasks and operations.

The task automation system described herein provides both chat UI and background functionality to automate certain performance engineering tasks, in order to enable, for example, non-technical persons to execute technical or specialized work items, to enable more efficient operations within these environments, and to decrease time, effort and costs associated with manual efforts normally associated with performance engineering execution and monitoring.

A conversational-based logic system is also provided that can be implemented with third party or built-in natural language processing (NLP) and/or natural language understanding (NLU), a user friendly GUI, and a conversation automation module or "dialog manager". The logic system and GUI can allow a non-technical user to initiate tests, analyze results and trigger actions through a conversational exchange with a chatbot that is tied into a background system to automate as much of the desired process as possible. With this logic system in place, users can execute mobile device management, such as build download and installation for "build on build" performance engineering. Users can also be provided with a test execution assistant via the chatbot, to allow the user to request and initiate any type of test, such as performance tests, UI tests (for both browser and mobile versions), etc. The chatbot can also provide a conversational tool to allow users to conduct basic conversations about the performance testing, fetch or generate test results or status updates, determine what the results mean, what the user may be looking for, etc.

As used herein a "build" may refer to the process of creating an application program for a software release, by taking all the relevant source code files and compiling them and then creating build artifacts, such as binaries or executable program(s), etc. "Build data" may therefore refer to any files or other data associated with a build. The terms "build" and "build data" (or "build file") may also be used interchangeably to commonly refer to a version or other manifestation of an application, or otherwise the code or program associated with an application that can be tested for performance related metrics.

It will be appreciated that while examples provided herein may be primarily directed to automated testing of mobile applications, the principles discussed herein equally apply to applications deployed on or otherwise used by other devices, such as desktop or laptop computers, e.g., to be run on a web browser or locally installed instance of an application. Similarly, the principles described herein can also be adapted to any performance engineering environment in which executable tasks are implemented, whether they include development, testing, implementation, production, quality assurance, etc.

Certain example systems and methods described herein are able to execute operations in a performance engineering environment. In one aspect, there is provided a device for executing operations in such a performance engineering environment. The device includes a processor, a communications module coupled to the processor, and a memory coupled to the processor. The memory stores computer executable instructions that when executed by the processor cause the processor to receive via the communications module, a request to implement a task within the environment, from an input to a chat user interface. The computer executable instructions, when executed, also cause the processor to communicate with a logic system to determine an intent from the request; determine one or more executable instructions to implement one or more operations associated with the task, based on the determined intent; and communicate via the communications module, with at least one endpoint to trigger execution of the one or more operations using the one or more executable instructions. The computer executable instructions, when executed, also cause the processor to receive via the communications module, data from the at least one endpoint, the data associated with execution of the one or more operations; generate a conversational response to the request based on or including the data received from the at least one endpoint; and have the conversational response rendered in the chat user interface.

In another aspect, there is provided a method of executing operations in a performance engineering environment. The method is executed by a device having a communications module. The method includes receiving via the communications module, a request to implement a task within the environment, from an input to a chat user interface; communicating with a logic system to determine an intent from the request; and determining one or more executable instructions to implement one or more operations associated with the task, based on the determined intent. The method also includes communicating via the communications module, with at least one endpoint to trigger execution of the one or more operations using the one or more executable instructions; receiving via the communications module, data from the at least one endpoint, the data associated with execution of the one or more operations; generating a conversational response to the request based on or including the data received from the at least one endpoint; and having the conversational response rendered in the chat user interface.

In another aspect, there is provided non-transitory computer readable medium for executing operations in a performance engineering environment. The computer readable medium includes computer executable instructions for receiving via a communications module, a request to implement a task within the environment, from an input to a chat user interface. The computer readable medium also includes instructions for communicating with a logic system to determine an intent from the request; determining one or more executable instructions to implement one or more operations associated with the task, based on the determined intent; and communicating via the communications module, with at least one endpoint to trigger execution of the one or more operations using the one or more executable instructions. The computer readable medium also includes instructions for receiving via the communications module, data from the at least one endpoint, the data associated with execution of the one or more operations; generating a conversational response to the request based on or including the data received from the at least one endpoint; and having the conversational response rendered in the chat user interface.

In certain example embodiments, the device can further have the logic system access a language server to determine the intent from the request. This may include having the logic system use the language server to apply a natural language understanding (NLU) process to correlate the request to the one or more operations associated with the task.

In certain example embodiments, the device can generate the executable instructions to implement the one or more operations in a format that is understandable to the at least one endpoint, wherein the device is configured to generate executable instructions in formats understandable to a plurality of disparate systems.

In certain example embodiments, the device can have the logic system communicate with the at least one endpoint via a respective application programming interface (API) exposed by a respective endpoint, to trigger execution of the one or more operations.

In certain example embodiments, the one or more operations can include initiating an application build download process, wherein the corresponding endpoint returns an initiation status.

In certain example embodiments, the one or more operations can include initiating a performance test, wherein the corresponding endpoint returns test data.

In certain example embodiments, the one or more operations can include checking the status of an executed or currently executing performance test, wherein the corresponding endpoint returns a status indicator.

In certain example embodiments, the request can be translated from a first spoken language to a second spoken language processed by the logic system.

In certain example embodiments, the device can have the logic system access a model generated by a machine learning system. The machine learning system can use messages exchanged via the chat user interface to build and/or refine the model over time.

In certain example embodiments, the performance engineering environment includes an application testing environment and an application development environment. The device can be coupled to both the application testing and application development environments to provide a centrally placed chat user interface to execute operations and receive data and status information from a plurality of disparate systems.

FIG. 1 illustrates an exemplary computing environment 8. In this example, the computing environment 8 may include an application testing environment 10, an application development environment 12, and a communications network 14 connecting one or more components of the computing environment 8. The computing environment 8 may also include or otherwise be connected to an application deployment environment 16, which provides a platform, service, or other entity responsible for posting or providing access to applications that are ready for use by client devices. The computing environment 8 may also include or otherwise be connected to a task automation system 24, which provides both chat UI and background functionality to automate certain performance engineering tasks, in order to enable, for example, non-technical workforce to execute technical or specialized work items, to enable more efficient operations within these environments, and to decrease time, effort and costs associated with manual efforts normally associated with performance engineering execution and monitoring. The application development environment 12 includes or is otherwise coupled to one or more repositories or other data storage elements for storing application build data 18. The application build data 18 can include any computer code and related data and information for an application to be deployed, e.g., for testing, execution or other uses.

In this example, the application build data 18 can be provided via one or more repositories and include the data and code required to perform application testing on a device or simulator. It can be appreciated that while FIG. 1 illustrates a number of test devices 22 that resemble a mobile communication device, such testing devices 22 can also include simulators, simulation devices or simulation processes, all of which may be collectively referred to herein as "test devices 22" for ease of illustration. The application testing environment 10 may include or otherwise have access to one or more repositories or other data storage elements for storing application test data 20, which includes any files, reports, information, results, metadata or other data associated with and/or generated during a test implemented within the application testing environment 10. Also shown in FIG. 1 is a client device 26, which may represent any electronic device that can be operated by a user to interact or otherwise use the task automation system 24 as herein described.

The computing environment 8 may be part of an enterprise or other organization that both develops and tests applications. In such cases, the communication network 14 may not be required to provide connectivity between the application development environment 12, the task automation system 24, and the application testing environment 10, wherein such connectivity is provided by an internal network. The application development environment 12, task automation system 24, and application testing environment 10 may also be integrated into the same enterprise environment as subsets thereof. That is, the configuration shown in FIG. 1 is illustrative only. Moreover, the computing environment 8 can include multiple enterprises or organizations, e.g., wherein separate organizations are configured to, and responsible for, application testing and application development. For example, an organization may contract a third-party to develop an app for their organization but perform testing internally to meet proprietary or regulatory requirements. Similarly, an organization that develops an app may outsource the testing stages, particularly when testing is performed infrequently. The application deployment environment 16 may likewise be implemented in several different ways. For example, the deployment environment 16 may include an internal deployment channel for employee devices, may include a public marketplace such as an app store, or may include any other channel that can make the app available to clients, consumers or other users.

One example of the computing environment 8 may include a financial institution system (e.g., a commercial bank) that provides financial services accounts to users and processes financial transactions associated with those financial service accounts. Such a financial institution system may provide to its customers various browser-based and mobile applications, e.g., for mobile banking, mobile investing, mortgage management, etc.

Test devices 22 can be, or be simulators for, client communication devices that would normally be associated with one or more users. Users may be referred to herein as customers, clients, correspondents, or other entities that interact with the enterprise or organization associated with the computing environment 8 via one or more apps. Such customer communication devices are not shown in FIG. 1 since such devices would typically be used outside of the computing environment 8 in which the development and testing occurs. Client device 26 shown in FIG. 1 may be a similar type of device as a customer communication device and is shown to illustrate a manner in which an individual can interact with the task automation system 24. However, it may be noted that such customer communication devices and/or client device 26 may be connectable to the application deployment environment 16, e.g., to download newly developed apps, to update existing apps, etc.

In certain embodiments, a user may operate the customer communication devices such that customer device performs one or more processes consistent with what is being tested in the disclosed embodiments. For example, the user may use customer device to engage and interface with a mobile or web-based banking application which has been developed and tested within the computing environment 8 as herein described. In certain aspects, test devices 22, customer devices, and client device 26 can include, but are not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication networks such as the communication network 14 shown by way of example in FIG. 1.

Communication network 14 may include a telephone network, cellular, and/or data communication network to connect different types of electronic devices. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

Referring back to FIG. 1, the computing environment 8 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the application development environment 12, task automation system 24, and/or application testing environment 10. The cryptographic server may be used to protect data within the computing environment 8 (include the application build data 18 and/or application test data 20) by way of encryption for data protection, digital signatures or message digests for data integrity, and by using digital certificates to authenticate the identity of the users and entity devices with which the application development environment 12, task automation system 24, and application testing environment 10 communicate to inhibit data breaches by adversaries. It can be appreciated that various cryptographic mechanisms and protocols can be chosen and implemented to suit the constraints and requirements of the particular deployment of the application development environment 12 and application testing environment 10 as is known in the art.

Figure 2:
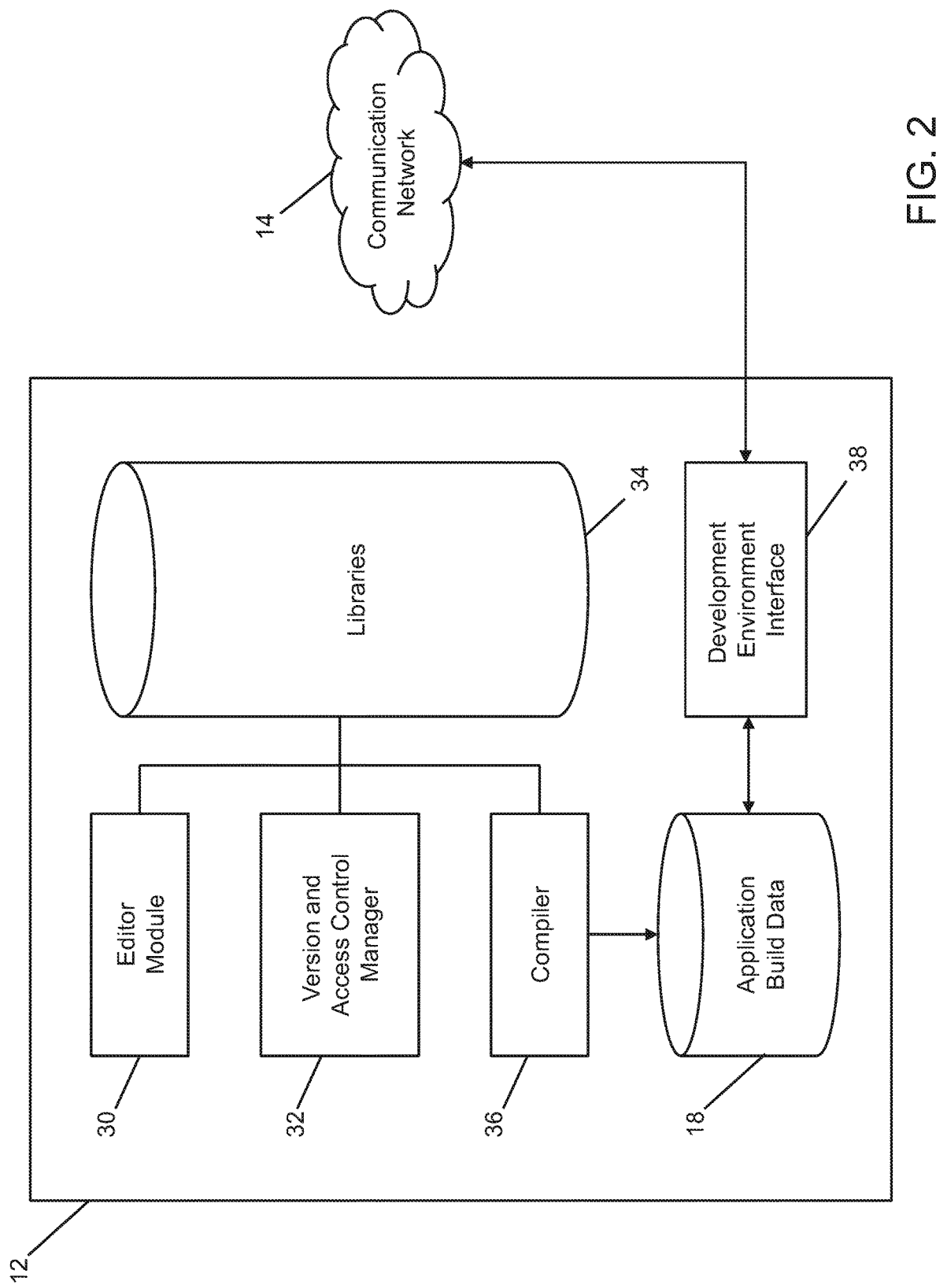
FIG. 2 is a block diagram of an example configuration of an application development environment.

In FIG. 2, an example configuration of the application development environment 12 is shown. It can be appreciated that the configuration shown in FIG. 2 has been simplified for ease of illustration. In certain example embodiments, the application development environment 12 may include an editor module 30, a version and access control manager 32, one or more libraries 34, and a compiler 36, which would be typical components utilized in application development. In this example, the application development environment 12 also includes the application build data 18, which, while shown within the environment 12, may also be a separate entity (e.g., repository) used to store and provide access to the stored build files. The application development environment 12 also includes or is provided with (e.g., via an application programming interface (API)), a development environment interface 38. The development environment interface 38 provides communication and data transfer capabilities between the application development environment 12 and the application testing environment 10 from the perspective of the application development environment 12. As shown in FIG. 2, the development environment interface 38 can connect to the communication network 14 to send/receive data and communications to/from the application testing environment 10, including instructions or commands initiated by/from the task automation system 24, as discussed further below.

The editor module 30 can be used by a developer/programmer to create and edit program code associated with an application being developed. This can include interacting with the version and access control manager 32 to control access to current build files and libraries 34 while honoring permissions and version controls. The compiler 36 may then be used to compile an application build file and other data to be stored with the application build data 18. It can be appreciated that a typical application or software development environment 12 may include other functionality, modules, and systems, details of which are omitted for brevity and ease of illustration. It can also be appreciated that the application development environment 12 may include modules, accounts, and access controls for enabling multiple developers to participate in developing an application, and modules for enabling an application to be developed for multiple platforms. For example, a mobile application may be developed by multiple teams, each team potentially having multiple programmers. Also, each team may be responsible for developing the application on a different platform, such as Apple iOS or Google Android for mobile versions, and Google Chrome or Microsoft Edge for web browser versions. Similarly, applications may be developed for deployment on different device types, even with the same underlying operating system.

By having build files stored for all of the various operating systems, device types, and versions that are currently compatible and being used, and providing access via the development environment interface 38, the application testing environment 10 can automatically obtain and deploy the latest builds to perform application testing in different scenarios. Such scenarios can include not only different device types, operating systems, and versions, but also the same build under different operating conditions.

While not shown in FIG. 2 for clarity of illustration, in example embodiments, the application development environment 12 may be implemented using one or more computing devices such as terminals, servers, and/or databases, having one or more processors, communications modules, and database interfaces. Such communications modules may include the development environment interface 38, which enables the application development environment 12 to communicate with one or more other components of the computing environment 8, such as the application testing environment 10, via a bus or other communication network, such as the communication network 14. While not delineated in FIG. 2, the application development environment 12 (and any of its devices, servers, databases, etc.) includes at least one memory or memory device that can include a tangible and non-transitory computer-readable medium having stored therein computer programs, sets of instructions, code, or data to be executed by the one or more processors. FIG. 2 illustrates examples of modules, tools and engines stored in memory within the application development environment 12. It can be appreciated that any of the modules, tools, and engines shown in FIG. 2 may also be hosted externally and be available to the application development environment 12, e.g., via communications modules such as the development environment interface 38.

Figure 3:
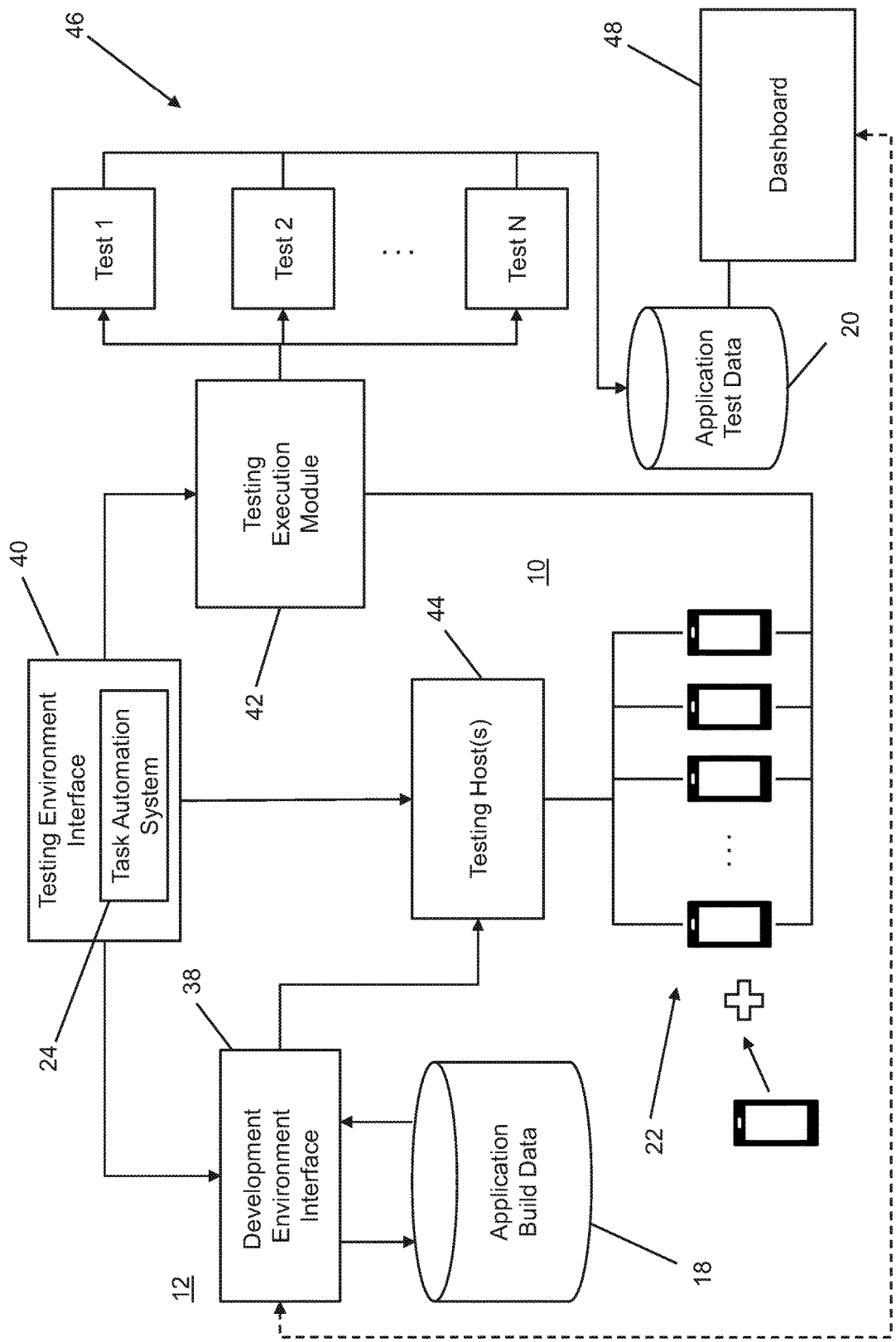
FIG. 3 is a block diagram of an example configuration of an application testing environment.

Turning now to FIG. 3, an example configuration of the application testing environment 10 is shown. The application testing environment 10 includes a testing environment interface 40, which is coupled to the development environment interface 38 in the application development environment 12, a testing execution module 42, and one or more testing hosts 44. The testing environment interface 40 can provide a UI for personnel or administrators in the application testing environment 10 to coordinate an automated build management process as herein described and to initiate or manage a test execution process as herein described. The testing environment interface 40 can also include, as illustrated in FIG. 3, the task automation system 24 to provide such UI for personnel or administrators, e.g., via a chat UI as described in greater detail below.

The testing environment interface 40 can provide a platform on which the task automation system 24 can operate to instruct the development environment interface 38, e.g., by sending a message or command via the communication network 14, to access the application build data 18 to obtain the latest application build(s) based on the number and types of devices being tested by the testing host(s) 44. The latest application builds are then returned to the application testing environment 10 by the development environment interface 38 to execute an automated build retrieval operation. As shown in FIG. 3, the application build data 18 can be sent directly to the testing host(s) 44 and thus the testing host(s) 44 can also be coupled to the communication network 14. It can be appreciated that the application build data 18 can also be provided to the testing host(s) 44 via the testing environment interface 40, e.g., through messages handled by the task automation system 24 via the chat UI 52 (see also FIG. 4). The host(s) 44 in this example have access to a number of test devices 22 which, as discussed above, can be actual devices or simulators for certain devices. The testing host(s) 44 are also scalable, allowing for additional test devices 22 to be incorporated into the application testing environment 10. For example, a new test device 22 may be added when a new device type is released and will be capable of using the application being tested. Upon installation, the application on each test device 22 can be configured to point to the appropriate environment under test and other settings can be selected/deselected.

The test devices 22 are also coupled to the testing execution module 42 to allow the testing execution module 42 to coordinate tests 46 to evaluate metrics, for example, by executing tests for application traffic monitoring, determining UI response times, examining device logs, and determining resource utilization metrics (with Test 1, Test 2, . . . , Test N; shown in FIG. 3 for illustrative purposes). The tests 46 can generate data logs, reports and other outputs, stored as application test data 20, which can be made available to various entities or components, such as a dashboard 48. The framework shown in FIG. 3 enables the application testing environment 10 to download the latest builds from the respective repositories for the respective device/OS platform(s) and run a UI flow on all test devices 22 to configure the environment, disable system pop-ups, and set feature flags. In this way, the framework can automate the build download and installation process. The framework shown in FIG. 3 can also enable tests 46 to be initiated, status updates for such tests 46 to be obtained, and other information gathered concerning the tests 46 and/or test data 20, through inputs interpreted by a chat UI of the task automation system 24.

It can be appreciated that while the testing environment interface 40, the testing host(s) 44, and the testing execution module 42 are shown as separate modules in FIG. 3, such modules may be combined in other configurations and thus the delineations shown in FIG. 3 are for illustrative purposes.

Figure 4:
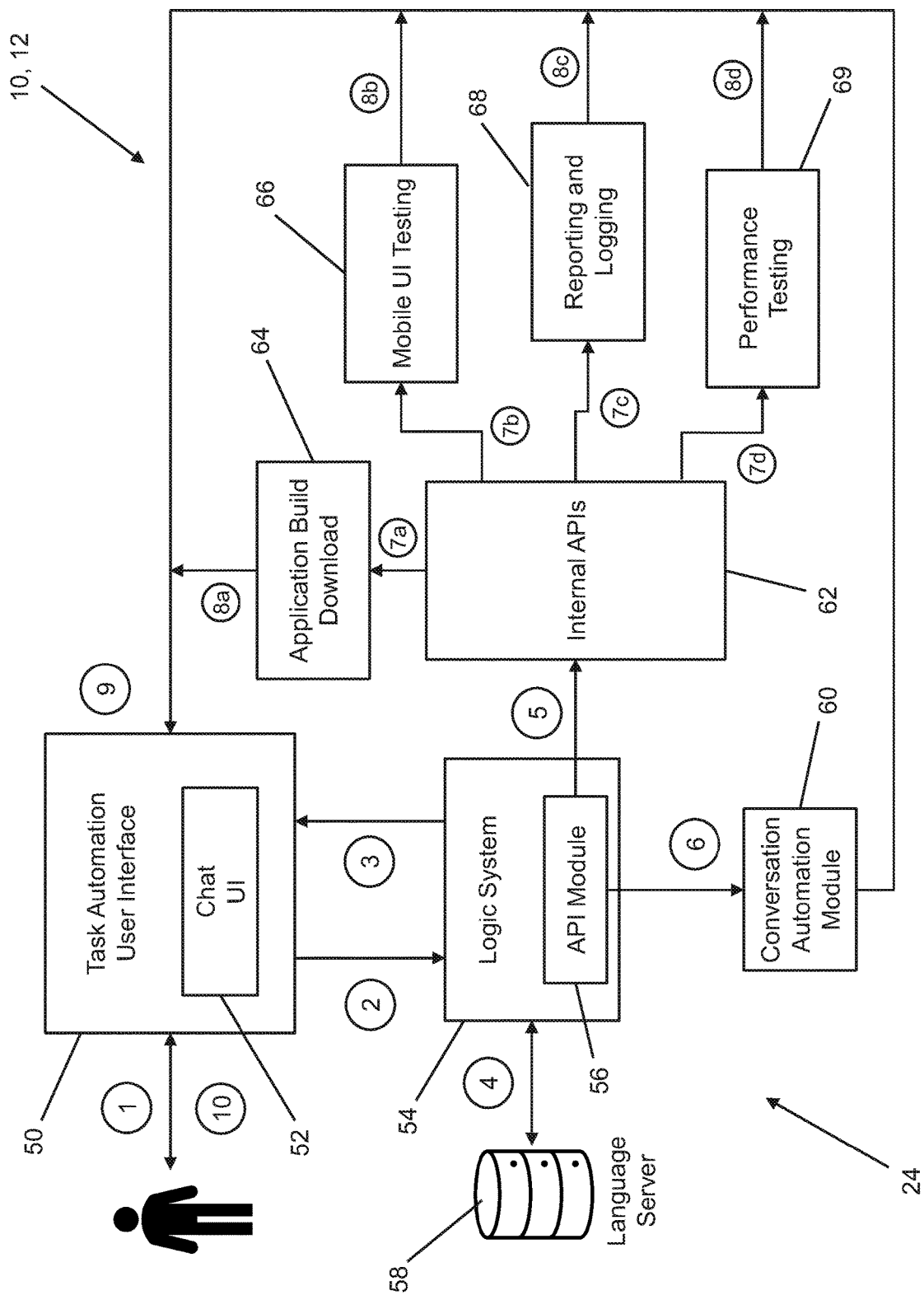
FIG. 4 is a schematic diagram of an example of a task automation system integrated with application development and testing environments.

Referring now to FIG. 4, a schematic diagram of the task automation system 24, integrated with the application development environment 10 and application testing environment 12, is shown. The configuration shown in FIG. 4 provides a backend system that can be implemented with a conversational-style message exchange user interface, also referred to herein as a "chat" user interface (UI) 52. In this configuration, a task automation user interface 50 is provided, which includes the chat UI 52, namely an application or front-end for users of client devices 26 to interact with the task automation system 24. The task automation user interface 50 is coupled to a logic system 54, which is used to determine an intent or instruction from a request made to the chat UI 52 via a chat message. In this way, a less technically inclined or trained user can interact with the environments 10, 12 to obtain information and data, to obtain the latest application build data 18, to initiate test, etc. The logic system 54 can be implemented using, for example the open source Botpress™ conversational AI platform.

The logic system 54 is coupled to a language server 58 in this example to access and leverage NLP and NLU modules/processes to assist in determining the intent from the request. It can be appreciated that while the language server 58 is provided as a separate component in FIG. 4, the logic system 54 can also adopt or otherwise include or provide the functionalities of the language server 58. The language server 58 can also be used to allow spoken language translation, e.g., to allow users to input messages in one spoken language that can be translated and interpreted without having the user perform any translation at his/her end. In this way, the task automation system 24 can provide a convenient way for users to interact in a language with which they are comfortable, which can make interpreting the requests more accurate.

The logic system 54 includes an API module 56 that is configured to make API calls to the different endpoints that can/should be reached based on the intent of the user's request. The API module 56 can therefore maintain the appropriate API calls for the various endpoints in the computing environment 8 that can be interacted with or controlled via the chat UI 52. The API module 56 is therefore coupled to one or more internal APIs 62 that connect into the various endpoints. In addition, the API module 56 can interface with a conversation automation module 60, which can be an internal component or third party component that can initiate a conversation in the chat UI 52 and collect responses as if it was a regular or routine conversation.

The internal APIs 62 in this example enable the logic system 54 to communicate with an application build download module 64, mobile UI testing module 66, reporting and logging module 68, and performance testing module 69 by way of example. It can be appreciated that other types of endpoints with API access can be plugged into the configuration shown in FIG. 4.

Referring to the encircled stage markers in FIG. 4, the user can, e.g., via their client device 26, initiate a request at stage 1. At stage 2, the task automation user interface 50 calls the logic system 54 to process the request, e.g., by inferring an intent from the text in a message input to the chat UI 52. The logic system 54 may return data at stage 3, either in response to the call at stage 2 or later if additional data such as statistics, dashboards, logs, etc. At stage 4, the logic system 54 can interface and communicate with the language server 58 to apply NLP/NLU processes to determine an intent from the request that can be translated into an actionable set of commands executable instructions via one or more API calls to the internal APIs 62 at stage 5. The API module 56 can also be executed at stage 6, to initiate a conversational response that incorporates any feedback from the API calls. Stage 7 in this example includes four sub-stages 7*a*, 7*b*, 7*c*, and 7*d*, each of which corresponds to an API call directed to a corresponding endpoint. For example, sub-stage 7*a* includes a call to the application build download module 64 to have the application testing environment 10 request the latest build from the application development environment 12. In the other examples shown in FIG. 4, testing execution or status updates can be initiated/fetched (sub-stages 7*b*, 7*d*), and reports or logs can be requested at sub-stage 7*c*.

Sub-stages 8*a*, 8*b*, 8*c*, and 8*d* represent individual endpoint responses to the request generated by the respective module 64, 66, 68, and 69. These responses can be collected by the conversation automation module 60 to generate one or more responses to the request that can be rendered in the chat UI 52 at stage 9. This allows the user of the client device 26 to view or otherwise observe such response(s) at stage 10, e.g., using a chat application 138 (see FIG. 8) on the client device 26.

The task automation system 24 thus provides a backend platform on which the chat UI 52 can sit to enable the user of a client device 26 to interact with the performance engineering environment (i.e., the computing environment 8 in this example) to execute, initiate, request or perform various operations, tasks or routines, without necessarily requiring knowledge or expertise of the underlying the system(s) that are required to perform these operations. The task automation system 24 also leverages a logic system 54 and language server 58 to provide a seamless conversational experience for the user while implementing largely technical background tasks, by inferring the intent of the user's request from the messages exchanged with the chat UI 52. That is, the chat UI 52 can provide both a front-end messaging-based user interface as well as an embedded or background "chatbot" with which to communicate.

Figure 5:
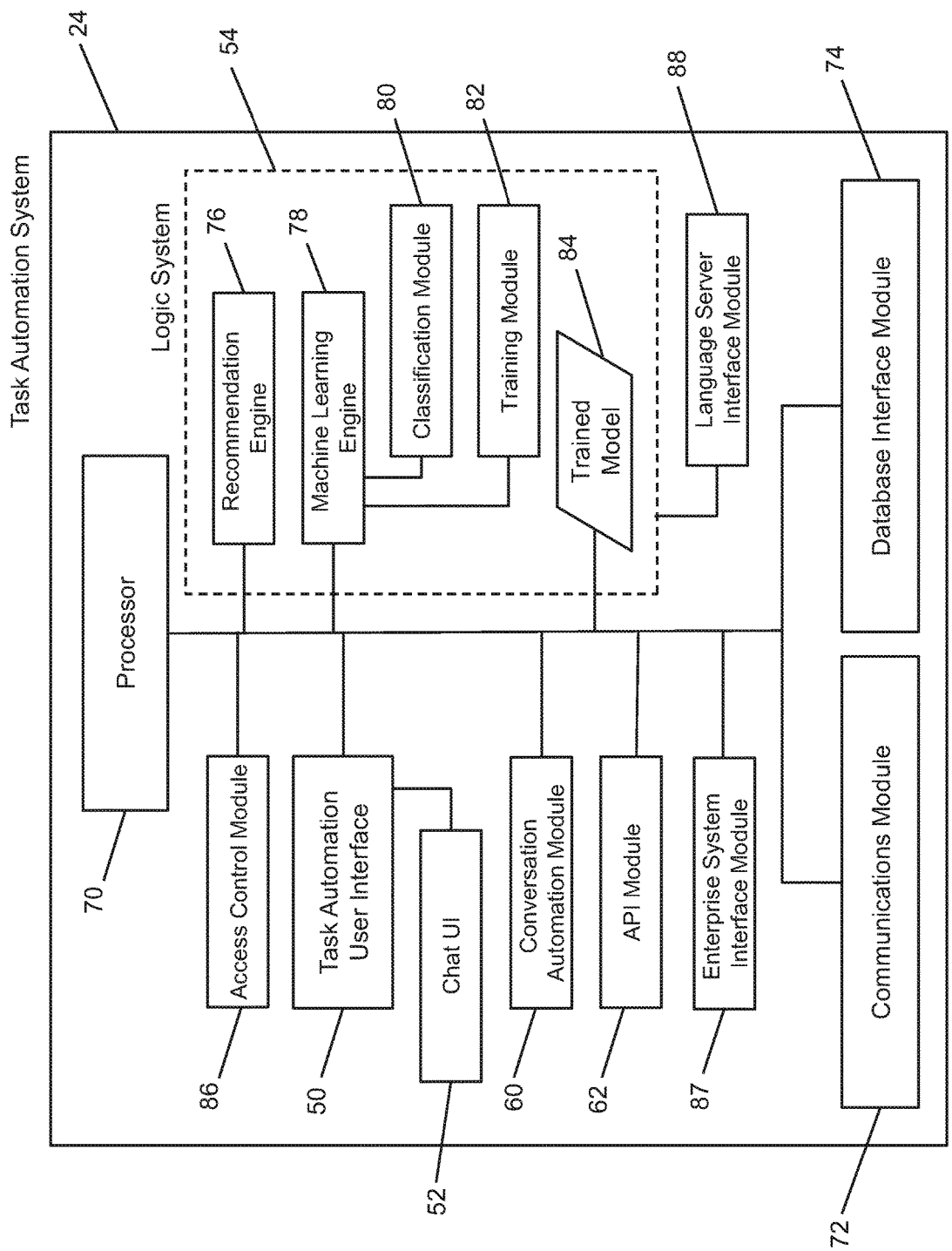
FIG. 5 is a block diagram of an example configuration of a task automation system.

In FIG. 5, an example configuration of the task automation system 24 is shown. In certain embodiments, the task automation system 24 may include one or more processors 70, a communications module 72, and a database interface module 74 for interfacing with the datastores for the build data 18 and test data 20 to retrieve, modify, and store (e.g., add) data. Communications module 72 enables the task automation system 24 to communicate with one or more other components of the computing environment 8, such as client device 26 (or one of its components), via a bus or other communication network, such as the communication network 14. While not delineated in FIG. 5, the task automation system 24 includes at least one memory or memory device that can include a tangible and non-transitory computer-readable medium having stored therein computer programs, sets of instructions, code, or data to be executed by processor 70. FIG. 5 illustrates examples of modules, tools and engines stored in memory on the task automation system 24 and operated by the processor 70. It can be appreciated that any of the modules, tools, and engines shown in FIG. 5 may also be hosted externally and be available to the task automation system 24, e.g., via the communications module 72. In the example embodiment shown in FIG. 5, the task automation system 24 includes the logic system 54, which includes a recommendation engine 76, a machine learning engine 78, a classification module 80, a training module 82, and a trained model 84. The logic system 54 also includes or has access to a language server interface module 88 to interface and/or communicate with the language server 58 as described above. The task automation system 24 also includes an access control module 86 and the task automation user interface 50. The task automation user interface 50 includes or has access to the chat UI 52 as shown in FIG. 4. The task automation system 24 also includes the conversation automation module 60, the API module 62 (which may instead be part of the logic system 54), and an enterprise system interface module 87.

The recommendation engine 76 is used by the logic system 54 of the task automation system 24 to generate one or more recommendations for the task automation system 24 and/or a client device 26 that is/are related to an association between inputs (requests) to the chat UI 52 and responses to these requests. For example, the logic system 54 can obtain a textual input from a user of the client device 26 requesting that a test be initiated, a status update to be obtained or other data to be gathered with respect to a process engineering task. As discussed above, this can include accessing the language server 58 via the language server interface module 88 in order to apply NLP/NLU processes. It may be noted that a recommendation as used herein may refer to a prediction, suggestion, inference, association or other recommended identifier that can be used to generate a suggestion, notification, command, instruction or other data that can be viewed, used or consumed by the task automation system 24, the testing environment interface 40 and/or the client devices 26 interacting with same. The recommendation engine 76 can access chat data (not shown) stored for/by the chat UI 52 and apply one or more inference processes to generate the recommendation(s). The recommendation engine 76 may utilize or otherwise interface with the machine learning engine 78 to both classify data currently being analyzed to generate a suggestion or recommendation, and to train classifiers using data that is continually being processed and accumulated by the task automation system 24. That is, the recommendation engine 76 can learn request- or response-related preferences and revise and refine classifications, rules or other analytics-related parameters over time. For example, the logic system 54 can be used to update and refine the trained model 84 using the training module 82 as client devices 26 interact with the chat UI 52 during various interactions to improve the NLP/NLU parameters and understanding of how users interact with the processing engineering environment.

The machine learning engine 78 may also perform operations that classify the chat data in accordance with corresponding classifications parameters, e.g., based on an application of one or more machine learning algorithms to the data or groups of the data (also referred to herein as "chat content", "conversation content", "user requests" or "user intent"). The machine learning algorithms may include, but are not limited to, a one-dimensional, convolutional neural network model (e.g., implemented using a corresponding neural network library, such as Keras®), and the one or more machine learning algorithms may be trained against, and adaptively improved, using elements of previously classified profile content identifying suitable matches between content identified and potential actions to be executed. Subsequent to classifying the event- or workflow-related content or content being analyzed, the recommendation engine 76 may further process each element of the content to identify, and extract, a value characterizing the corresponding one of the classification parameters, e.g., based on an application of one or more additional machine learning algorithms to each of the elements of the chat-related content. By way of example, the additional machine learning algorithms may include, but are not limited to, an adaptive NLP algorithm that, among other things, predicts starting and ending indices of a candidate parameter value within each element of the content, extracts the candidate parameter value in accordance with the predicted indices, and computes a confidence score for the candidate parameter value that reflects a probability that the candidate parameter value accurately represents the corresponding classification parameter. As described herein, the one or more additional machine learning algorithms may be trained against, and adaptively improved using, the locally maintained elements of previously classified content. Classification parameters may be stored and maintained using the classification module 80, and training data may be stored and maintained using the training module 82.

The trained model 84 may also be created, stored, refined, updated, re-trained, and referenced by the task automation system 24 (e.g., by way of the logic system 54) to determine associations between request messages and suitable responses or actions, and/or content related thereto. Such associations can be used to generate recommendations or suggestions for improving the conversational exchange and understanding of the users' intents via the text or other information input to the chat UI 52.

In some instances, classification data stored in the classification module 80 may identify one or more parameters, e.g., "classification" parameters, that facilitate a classification of corresponding elements or groups of recognized content based on any of the exemplary machine learning algorithms or processes described herein. The one or more classification parameters may correspond to parameters that can indicate an affinity or compatibility between the request and response (chat) data, and certain potential actions. For example, a request to initiate a test can include recognition of the message as being a request and the parsing of the message to determine a suitable endpoint and instruction, command or request to forward along to that endpoint.

In some instances, the additional, or alternate, machine learning algorithms may include one or more adaptive, NLP algorithms capable of parsing each of the classified portions of the content and predicting a starting and ending index of the candidate parameter value within each of the classified portions. Examples of the adaptive, NLP algorithms include, but are not limited to, NLP models that leverage machine learning processes or artificial neural network processes, such as a named entity recognition model implemented using a SpaCy® library.

Examples of these adaptive, machine learning processes include, but are not limited to, one or more artificial, neural network models, such as a one-dimensional, convolutional neural network model, e.g., implemented using a corresponding neural network library, such as Keras®. In some instances, the one-dimensional, convolutional neural network model may implement one or more classifier functions or processes, such a Softmax® classifier, capable of predicting an association between an element of event data (e.g., a value or type of data being augmented with an event or workflow) and a single classification parameter and additionally, or alternatively, multiple classification parameters.

Based on the output of the one or more machine learning algorithms or processes, such as the one-dimensional, convolutional neural network model described herein, machine learning engine 78 may perform operations that classify each of the discrete elements of event- or workflow-related content as a corresponding one of the classification parameters, e.g., as obtained from classification data stored by the classification module 80.

The outputs of the machine learning algorithms or processes may then be used by the recommendation engine 76 to generate one or more suggested recommendations, instructions, commands, notifications, rules, or other instructional or observational elements that can be presented to the client device 26 via the chat UI 52.

Referring again to FIG. 5, the access control module 86 may be used to apply a hierarchy of permission levels or otherwise apply predetermined criteria to determine what chat data or other client/user, financial or transactional data can be shared with which entity in the computing environment 8. For example, the task automation system 24 may have been granted access to certain sensitive user profile data for a user, which is associated with a certain client device 26 in the computing environment 8. Similarly, certain client data may include potentially sensitive information such as age, date of birth, or nationality, which may not necessarily be needed by the task automation system 24 to execute certain actions (e.g., to more accurately determine the spoken language or conversational style of that user). As such, the access control module 86 can be used to control the sharing of certain client data or chat data, a permission or preference, or any other restriction imposed by the computing environment 8 or application in which the task automation system 24 is used.

The task automation system 24 in this example also includes the task automation user interface 50 described above, which provides the chat UI 52. The conversation automation module 60 and API module 62 are also shown in FIG. 5 which, as described above, can be used to generate a response to a request entered in the chat UI 52 and communicate with endpoints within the process engineering environment such as the application testing environment 10 or application development environment 12 to implement a task such as initiating a test or obtaining status events, etc.

As illustrated in FIG. 5, the logic system 54 as well as the task automation system 24 can be considered one or more devices having a processor 70, memory and a communications module 72 configured to work with, or as part of, the computing environment 8, to perform the operations described herein. It can be appreciated that the various elements of the task automation system 24 and logic system 54 are shown delineated as such in FIG. 5 for illustrative purposes and clarity of description and could be provided using other configurations and distribution of functionality and responsibilities.

The task automation system 24 may also include the enterprise system interface module 87 to provide a graphical user interface (GUI) or API connectivity to communicate with an enterprise system 90 (see FIG. 6) to obtain client data 98 for a certain user interacting with the task automation system 24. It can be appreciated that the enterprise system interface module 87 may also provide a web browser-based interface, an application or "app" interface, a machine language interface, etc.

Figure 6:
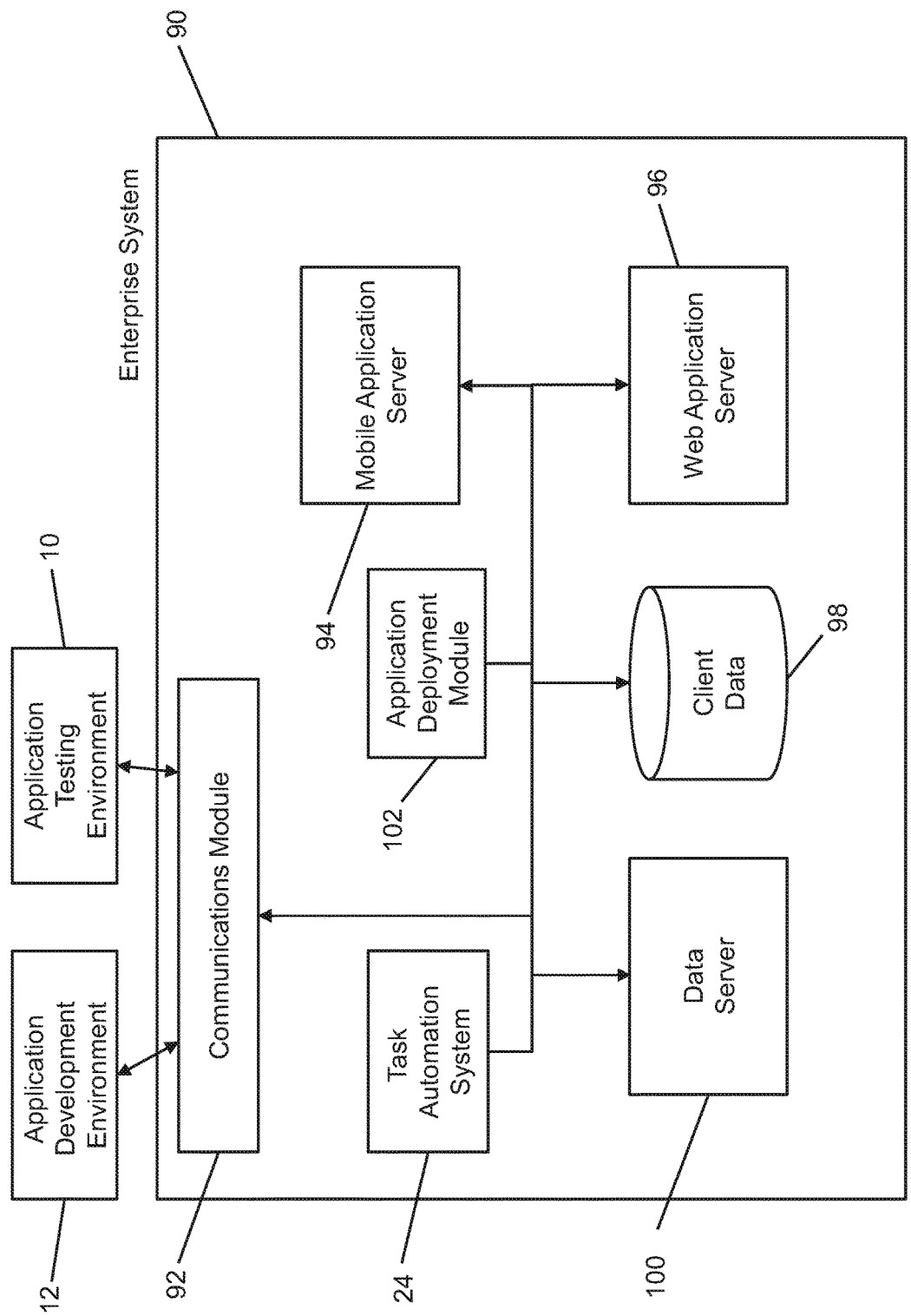
FIG. 6 is a block diagram of an example configuration of an enterprise system.

In FIG. 6, an example configuration of an enterprise system 90 is shown. The enterprise system 90 includes a communications module 92 that enables the enterprise system 90 to communicate with one or more other components of the computing environment 8, such as the application testing environment 10, application development environment 12, or task automation system 24, via a bus or other communication network, such as the communication network 14. While not delineated in FIG. 6, the enterprise system 90 includes at least one memory or memory device that can include a tangible and non-transitory computer-readable medium having stored therein computer programs, sets of instructions, code, or data to be executed by one or more processors (not shown for clarity of illustration). FIG. 6 illustrates examples of servers and datastores/databases operable within the enterprise system 90. It can be appreciated that any of the components shown in FIG. 6 may also be hosted externally and be available to the enterprise system 90, e.g., via the communications module 92. In the example embodiment shown in FIG. 6, the enterprise system 90 includes one or more servers to provide access to client data 98, e.g., to assist in determining an intent from a request input to the chat UI 52 or for development or testing purposes. Exemplary servers include a mobile application server 94, a web application server 96 and a data server 100. Although not shown in FIG. 6, the enterprise system 90 may also include a cryptographic server for performing cryptographic operations and providing cryptographic services. The cryptographic server can also be configured to communicate and operate with a cryptographic infrastructure. The enterprise system 90 may also include one or more data storage elements for storing and providing data for use in such services, such as data storage for storing client data 98.

Mobile application server 94 supports interactions with a mobile application installed on client device 26 (which may be similar or the same as a test device 22). Mobile application server 94 can access other resources of the enterprise system 90 to carry out requests made by, and to provide content and data to, a mobile application on client device 26. In certain example embodiments, mobile application server 94 supports a mobile banking application to provide payments from one or more accounts of user, among other things.

Web application server 96 supports interactions using a website accessed by a web browser application running on the client device. It can be appreciated that the mobile application server 94 and the web application server 96 can provide different front ends for the same application, that is, the mobile (app) and web (browser) versions of the same application. For example, the enterprise system 90 may provide a banking application that be accessed via a smartphone or tablet app while also being accessible via a browser on any browser-enabled device.

The client data 98 can include, in an example embodiment, financial data that is associated with users of the client devices (e.g., customers of the financial institution). The financial data may include any data related to or derived from financial values or metrics associated with customers of a financial institution system (i.e., the enterprise system 60 in this example), for example, account balances, transaction histories, line of credit available, credit scores, mortgage balances, affordability metrics, investment account balances, investment values and types, among many others. Other metrics can be associated with the financial data, such as financial health data that is indicative of the financial health of the users of the client devices 26.

An application deployment module 102 is also shown in the example configuration of FIG. 6 to illustrate that the enterprise system 90 can provide its own mechanism to deploy the developed and tested applications onto client devices 26 within the enterprise. It can be appreciated that the application deployment module 102 can be utilized in conjunction with a third-party deployment environment such as an app store to have tested applications deployed to employees and customers/clients.

Figure 7:
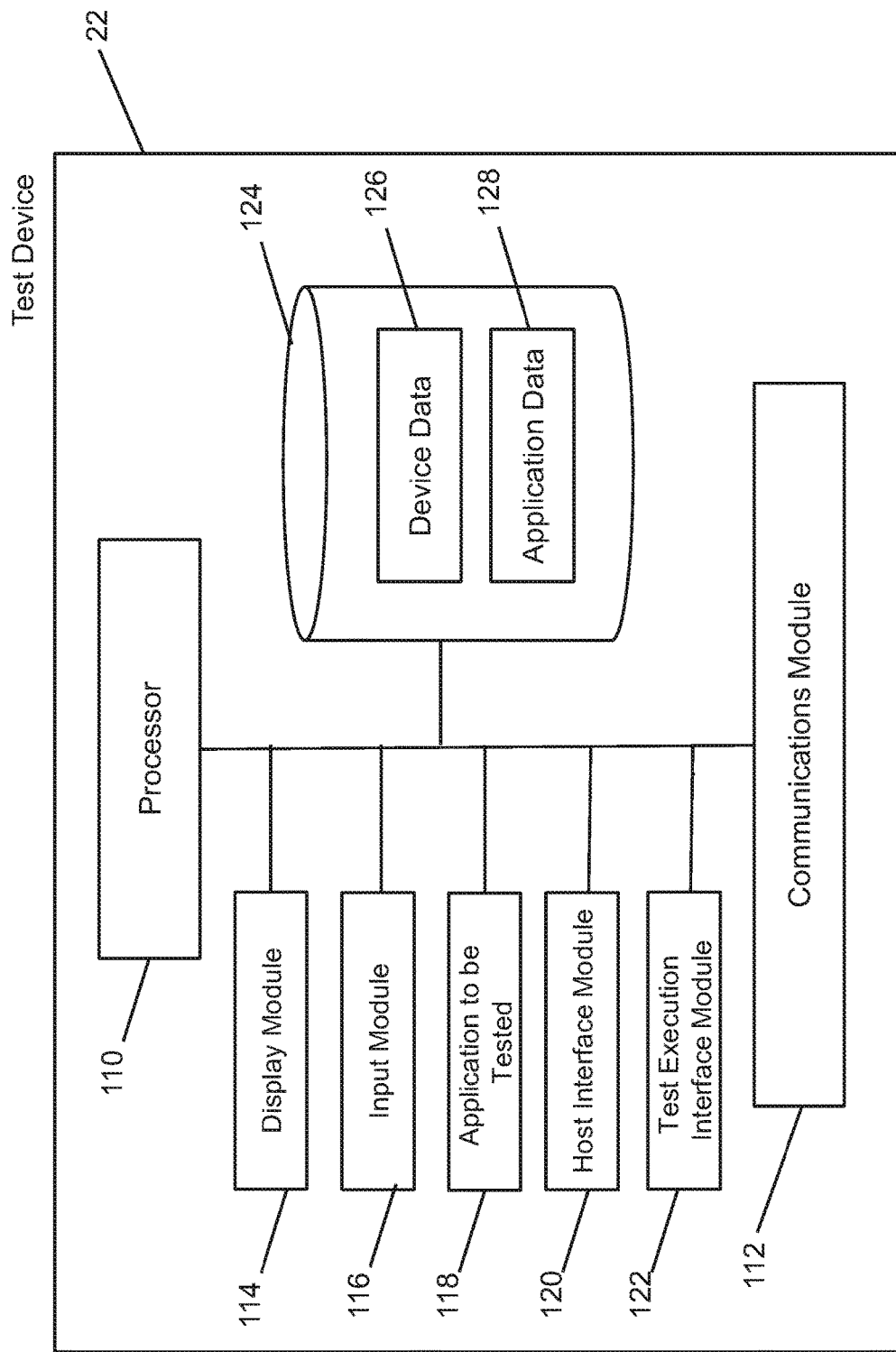
FIG. 7 is a block diagram of an example configuration of a test device used to test an application build in the application testing environment.

In FIG. 7, an example configuration of a test device 22 is shown. It can be appreciated that the test device 22 shown in FIG. 7 can correspond to an actual device or represent a simulation of such a device 22. In certain embodiments, the client device 22 may include one or more processors 110, a communications module 112, and a data store 124 storing device data 126 and application data 128. Communications module 112 enables the test device 22 to communicate with one or more other components of the computing environment 8 via a bus or other communication network, such as the communication network 14. While not delineated in FIG. 7, the client device 22 includes at least one memory or memory device that can include a tangible and non-transitory computer-readable medium having stored therein computer programs, sets of instructions, code, or data to be executed by processor 110. FIG. 7 illustrates examples of modules and applications stored in memory on the test device 22 and operated by the processor 110. It can be appreciated that any of the modules and applications shown in FIG. 7 may also be hosted externally and be available to the test device 22, e.g., via the communications module 112.

In the example embodiment shown in FIG. 7, the test device 22 includes a display module 114 for rendering GUIs and other visual outputs on a display device such as a display screen, and an input module 116 for processing user or other inputs received at the test device 22, e.g., via a touchscreen, input button, transceiver, microphone, keyboard, etc. The test device 22 may also include an application 118 to be tested that includes the latest application build data 18 to be tested using the test device 22, e.g., by executing tests. The test device 22 may include a host interface module 120 to enable the test device 22 to interface with a testing host for loading an application build. The test device 22 in this example embodiment also includes a test execution interface module 122 for interfacing the application 118 with the testing execution module. The data store 124 may be used to store device data 126, such as, but not limited to, an IP address or a MAC address that uniquely identifies test device 22. The data store 124 may also be used to store application data 128, such as, but not limited to, login credentials, user preferences, cryptographic data (e.g., cryptographic keys), etc.

Figure 8:
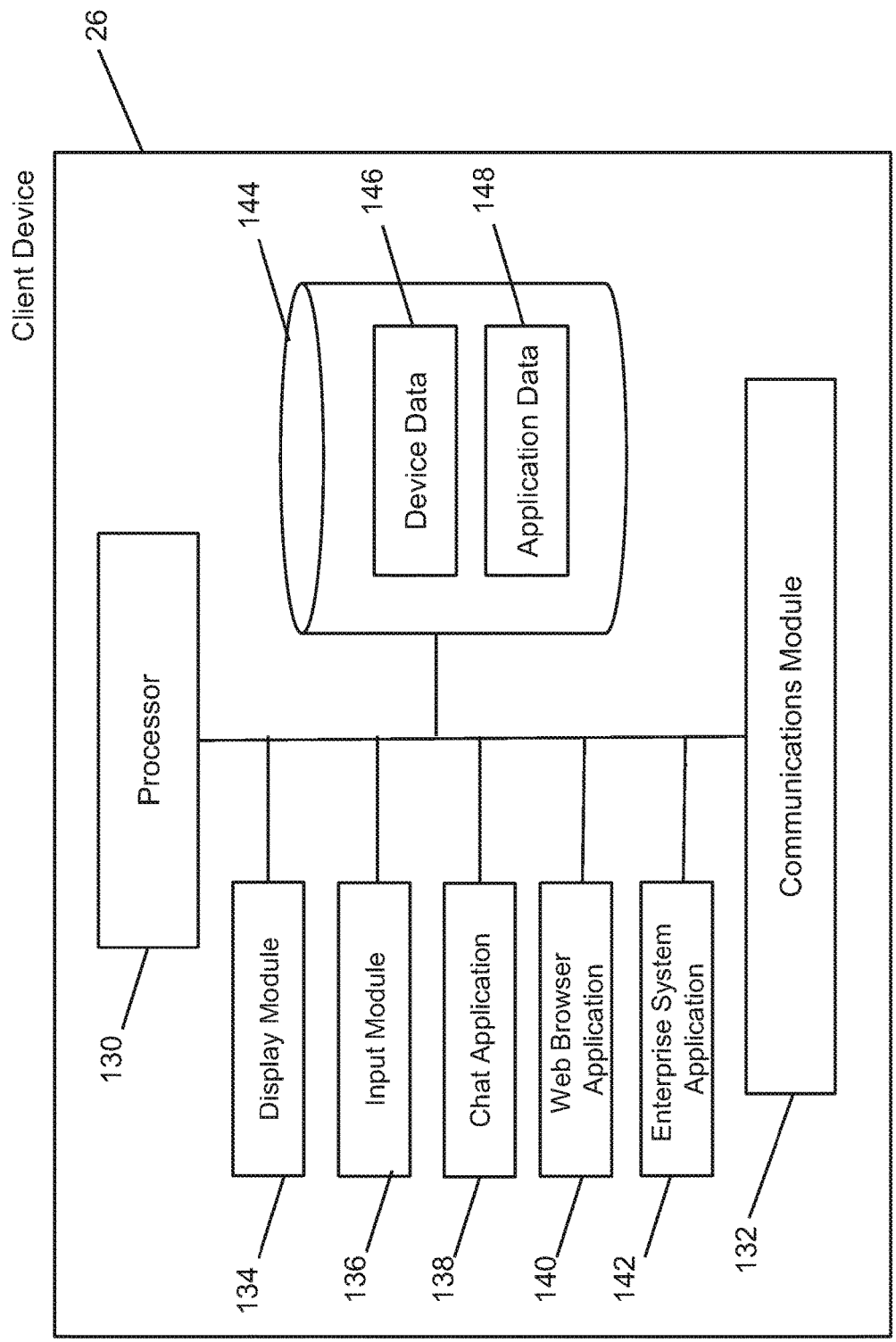
FIG. 8 is a block diagram of an example configuration of a client device used to interface with, for example, the task automation system.

In FIG. 8, an example configuration of the client device 26 is shown. In certain embodiments, the client device 26 may include one or more processors 130, a communications module 132, and a data store 144 storing device data 146 and application data 148. Communications module 132 enables the client device 26 to communicate with one or more other components of the computing environment 8, such as the task automation system 24, via a bus or other communication network, such as the communication network 14. While not delineated in FIG. 8, the client device 26 includes at least one memory or memory device that can include a tangible and non-transitory computer-readable medium having stored therein computer programs, sets of instructions, code, or data to be executed by processor 130. FIG. 8 illustrates examples of modules and applications stored in memory on the client device 26 and operated by the processor 130. It can be appreciated that any of the modules and applications shown in FIG. 8 may also be hosted externally and be available to the client device 26, e.g., via the communications module 132.

In the example embodiment shown in FIG. 8, the client device 26 includes a display module 134 for rendering GUIs and other visual outputs on a display device such as a display screen, and an input module 136 for processing user or other inputs received at the client device 26, e.g., via a touchscreen, input button, transceiver, microphone, keyboard, etc. The client device 26 may also include a chat application 138, which may take the form of a customized app, plug-in, widget, or software component provided by the task automation system 24 for use by the client device 26 to use the chat UI 52. Similarly, the client device 26 may include an enterprise system application 142 provided by their enterprise system 90. The client device 26 in this example embodiment also includes a web browser application 140 for accessing Internet-based content, e.g., via a mobile or traditional website. The data store 144 may be used to store device data 146, such as, but not limited to, an IP address or a MAC address that uniquely identifies client device 26 within environment 8. The data store 144 may also be used to store application data 148, such as, but not limited to, login credentials, user preferences, cryptographic data (e.g., cryptographic keys), etc.

It will be appreciated that only certain modules, applications, tools and engines are shown in FIGS. 2 to 8 for ease of illustration and various other components would be provided and utilized by the application testing environment 10, application development environment 12, task automation system 24, test device 22, enterprise system 90, and client device 26 as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of any of the servers or other devices in the application testing environment 10, application development environment 12, task automation system 24, enterprise system 90, client device 26, or test device 22, or accessible or connectable thereto. Any application or module herein described may be implemented using computer readable/executable instructions that may be stored or otherwise held by such computer readable media.

Figure 9:
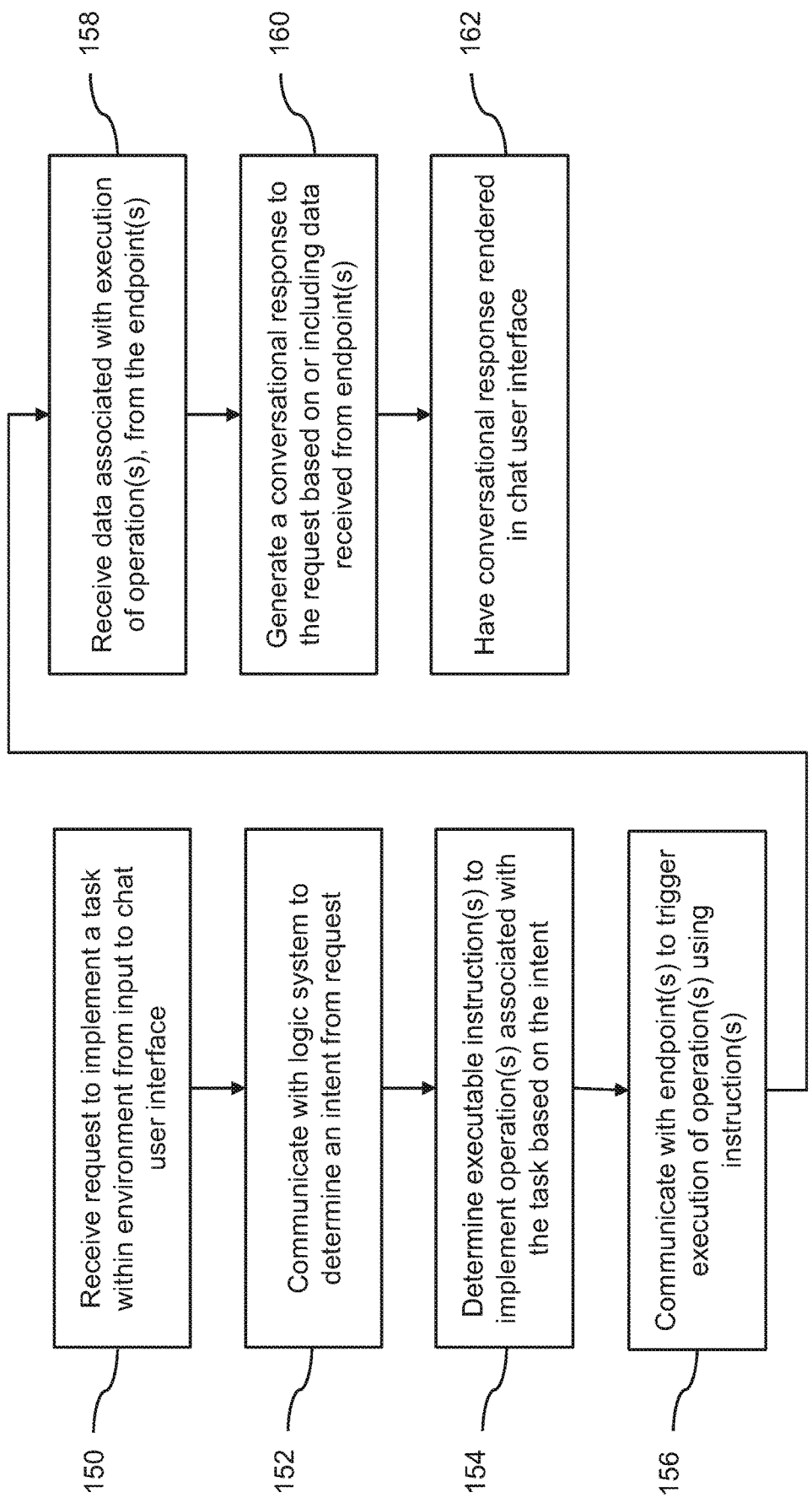
FIG. 9 is a flow diagram of an example of computer executable instructions for executing tasks in a performance engineering environment such as an application testing or development environment.

Referring to FIG. 9, an example embodiment of computer executable instructions for executing tasks in a performance engineering environment, such as an application testing or development environment 10, 12, or another computing environment 8, is shown. At block 150, the task automation system 24 receives a request to implement a task within the computing environment 8, from an input to the chat UI 52. At block 152, the task automation system 24 communicates with the logic system 54 to determine or infer an intent from the request. This can include communicating with the language server 58 and/or referencing the trained model 84. Moreover, this can also include translating the text of the request from one spoken language into another that can be interpreted by the language server 58 or the logic system 54.

At block 154, the logic system 54 determines executable instructions to implement one or more operations associated with the task based on the intent. That is, the logic system 54 uses the intent inferred from the request to determine which endpoints, if any, should be communicated with to satisfy the request. For example, the request may involve fetching a latest application build, executing one or more tests, and returning a status of the initiated test(s), which would require determining which endpoints require instructions and the associated API calls to generate. This can also include generating executable instructions in a format that is understandable to that endpoint. At block 156, the logic system 54 uses the API module 56 to communicate, via the internal APIs 62, with the endpoints (e.g., modules 64, 66, 68, 69 in FIG. 4). At block 158, the task automation system 24 receives data associated with the execution of the one or more operations, from the endpoints. As illustrated in FIG. 4, this can include receiving multiple replies to the conversation automation module 60 to be formatted or otherwise rendered as conversational response(s) based on or including the received data, at block 160. The conversational response(s) can then be rendered in the chat UI 52 at block 162.

Figure 10:
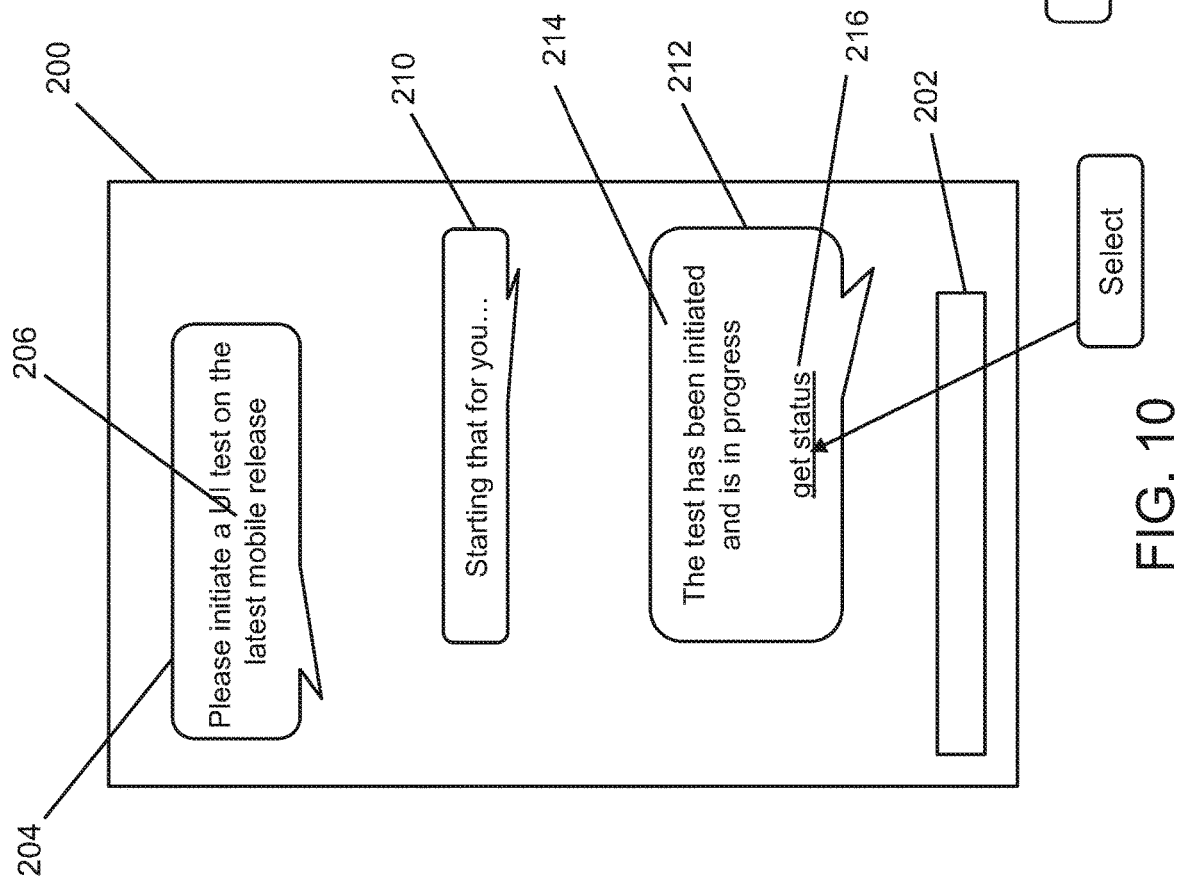
FIG. 10 is a screen shot of an example of a graphical user interface (GUI) for a chat user interface.

Turning now to FIG. 10, a screen shot 200 of the chat UI 52 is shown. In this example, a first user message 204 includes a textual request 206, namely: "Please initiate a UI test on the latest mobile release" that can be entered via a message input box 202. The chat UI 52 in this example replies immediately with a status message 210, namely: "Starting that for you . . . ". Once communication has been established with the appropriate endpoint, the chat UI 52 can display a first response message 212 with response text 214 and a link 216 to further content. In this example, the response text 214 indicates: "The test has been initiated and is in progress", and the link 216 allows the user to click through to status information on that test. By selecting this link 216, the user can be navigated to another UI, a dashboard, or additional data can be inserted with in the chat UI screen.

Figure 11:
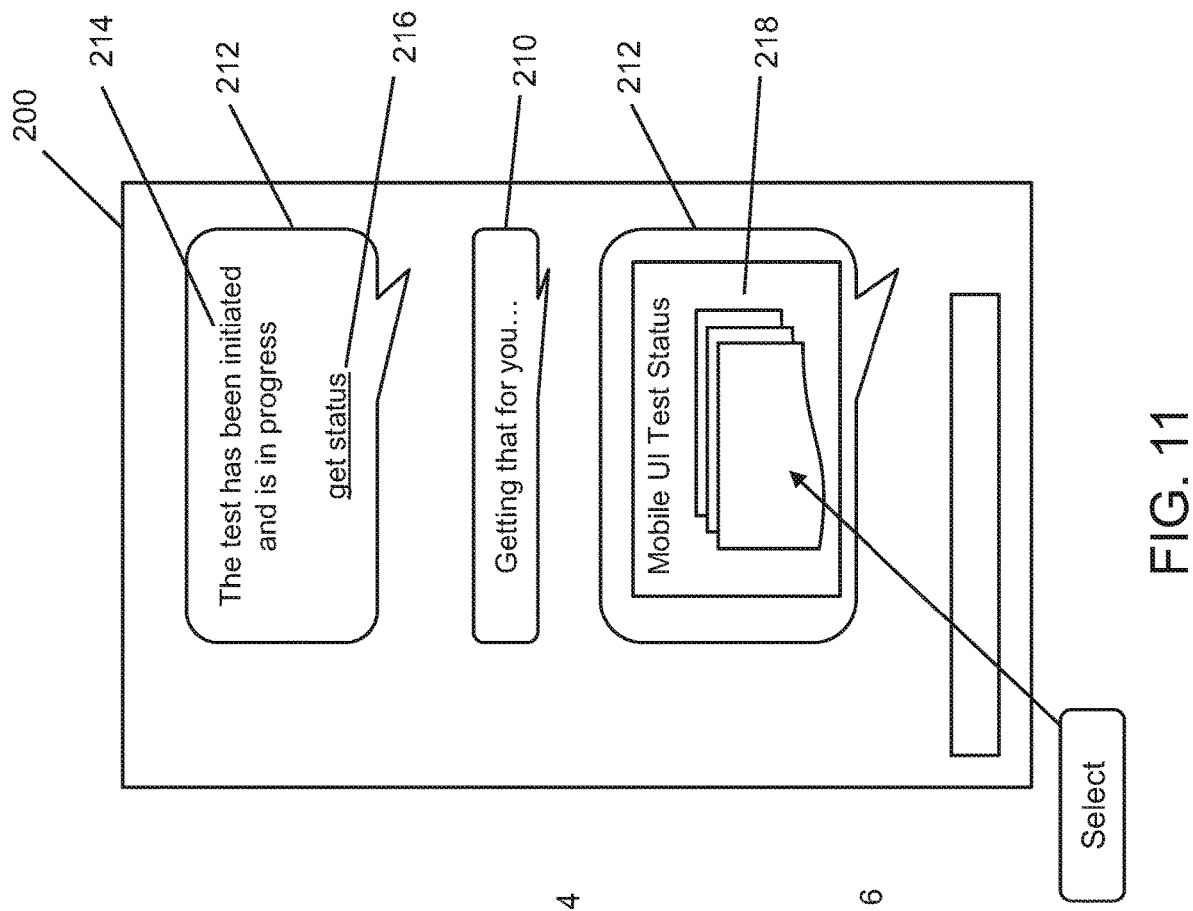
FIG. 11 is a screen shot of the chat user interface of FIG. 10 after subsequent messaging.

Turning now to FIG. 11, the screen shot 200 of the chat UI 52 is shown in a subsequent stage of conversation. In this example, after selecting the link 216 as illustrated in FIG. 10, a further status message 210 is displayed, in this case indicating: "Getting that for you . . . ", with "that" referring to the status information associated with the link 216. A further response message 212 is then displayed, which includes a visual representation 218 of the mobile UI test status. It can be appreciated that this message can include the status itself if space permits or, as shown in FIG. 11, the user can select the visual representation 218 to navigate to another user interface such as a statistics or monitoring dashboard. As such, it can be seen that the chat UI 52 can provide a central point for the user to issue commands, obtain data, and navigate to other programs without the need to have specialized knowledge or training with respect to these other programs or interfaces.

Referring to FIG. 12, an example embodiment of computer executable instructions for using the chat UI 52 to initiate periodic testing based on acquiring a latest build for an application is shown. In this example embodiment, the process flow proceeds from block 156 (see FIG. 9) to the periodic testing execution and returns a result to the chat UI 52 at block 158 (see FIG. 9). That is, FIG. 12 illustrates an underlying workflow that can be initiated by the user via the chat UI 52, without requiring knowledge of that workflow. At block 300, one or more tests are run for a current build. At block 302, test results data are acquired. It can be appreciated that the current test results data acquired at block 302 can be compared with previous test results data at block 304, e.g., to determine whether feedback provided to the application development environment 12 in a previous iteration has led to an improvement in the application. As shown in FIG. 12, this comparison can be used to provide additional feedback with the test results data send to the application development environment 12 at block 306. After a period of time, e.g., one day, one week, etc.; the application testing environment 10 detects the next testing cycle at block 308 and requests a new build from the application development environment 12 at block 310. It can be appreciated that blocks 306, 308 and 310 can be coordinated and/or executed by the testing environment interface 50. The process can be repeated by returning to block 300 wherein new testing is performed using the latest build files that have been acquired, installed, and provisioned on the test devices 22.

From FIG. 12 it can be seen that the chat UI can provide a familiar and user friendly front end experience for a user to interface with a more complex process via the backend functionality provided by the task automation system 24.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A device for executing operations in a performance engineering environment, the device comprising:
 a processor;
 a communications module coupled to the processor; and
 a memory coupled to the processor, the memory storing computer executable instructions that when executed by the processor cause the processor to:
  receive via the communications module, a request to implement automated testing within the performance engineering environment, from an input to a centrally integrated chat user interface connected to and between both an application testing environment and an application development environment of the performance engineering environment to coordinate testing operations among disparate systems;
  generate and transmit, via the communications module to the centrally integrated chat user interface, one or more instructional elements that suggest modifications to the request;
  receive, via the communications module, an updated request from another input to the centrally integrated chat user interface;
  communicate with a logic system to determine an intent from the updated request;
  determine one or more executable instructions to implement one or more operations associated with automated testing, based on the determined intent, wherein the one or more operations of the automated testing are implemented within one or more of the application testing environment and the application development environment;
  communicate via the communications module, with at least one endpoint to trigger execution of the one or more operations using the one or more executable instructions;
  receive via the communications module, data from the at least one endpoint, the data associated with execution of the one or more operations;
  generate a conversational response to the updated request based on or including the data received from the at least one endpoint; and
  have the conversational response rendered in the centrally integrated chat user interface.

2. The device of claim 1, wherein the computer executable instructions further cause the processor to:
 have the logic system access a language server to determine the intent from the updated request.

3. The device of claim 2, wherein the computer executable instructions further cause the processor to:
 have the logic system use the language server to apply a natural language understanding (NLU) process to correlate the updated request to the one or more operations associated with the automated testing.

4. The device of claim 1, wherein the computer executable instructions further cause the processor to:
 generate the executable instructions to implement the one or more operations in a format that is understandable to the at least one endpoint, wherein the device is configured to generate executable instructions in formats understandable to a plurality of disparate systems.

5. The device of claim 1, wherein the computer executable instructions further cause the processor to:
 have the logic system communicate with the at least one endpoint via a respective application programming interface (API) exposed by a respective endpoint, to trigger execution of the one or more operations.

6. The device of claim 1, wherein the one or more operations comprises initiating an application build download process, and wherein the corresponding endpoint returns an initiation status.

7. The device of claim 1, wherein the one or more operations comprises initiating a performance test, and wherein the corresponding endpoint returns test data which includes at least one of application traffic monitoring, determining UI response times, examining device logs, and determining device resource utilization metrics.

8. The device of claim 1, wherein the one or more operations comprises checking the status of an executed or currently executing performance test, and wherein the corresponding endpoint returns a status indicator.

9. The device of claim 1, wherein the updated request is translated from a first spoken language to a second spoken language processed by the logic system.

10. The device of claim 1, wherein the computer executable instructions further cause the processor to:
 have the logic system access a model generated by a machine learning system, the machine learning system using messages exchanged via the centrally integrated chat user interface to build and/or refine the model over time.

11. A method of executing operations in a performance engineering environment, the method executed by a device having a communications module and comprising:
 receiving via the communications module, a request to implement automated testing within the performance engineering environment, from an input to a centrally integrated chat user interface connected to and between both an application testing environment and an application development environment of the performance engineering environment to coordinate testing operations among disparate systems;

generating and transmitting, via the communications module to the centrally integrated chat user interface, one or more instructional elements that suggest modifications to the request;

receiving, via the communications module, an updated request from another input to the centrally integrated chat user interface;

communicating with a logic system to determine an intent from the updated request;

determining one or more executable instructions to implement one or more operations associated with automated testing, based on the determined intent, wherein the one or more operations of the automated testing are implemented within one or more of the application testing environment and the application development environment;

communicating via the communications module, with at least one endpoint to trigger execution of the one or more operations using the one or more executable instructions;

receiving via the communications module, data from the at least one endpoint, the data associated with execution of the one or more operations;

generating a conversational response to the updated request based on or including the data received from the at least one endpoint; and having the conversational response rendered in the centrally integrated chat user interface.

12. The method of claim 11, further comprising:
generating the executable instructions to implement the one or more operations in a format that is understandable to the at least one endpoint, wherein the device is configured to generate executable instructions in formats understandable to a plurality of disparate systems.

13. The method of claim 11, further comprising:
having the logic system communicate with the at least one endpoint via a respective application programming interface (API) exposed by a respective endpoint, to trigger execution of the one or more operations.

14. The method of claim 11, wherein the one or more operations comprises initiating an application build download process, and wherein the corresponding endpoint returns an initiation status.

15. The method of claim 11, wherein the one or more operations comprises initiating a performance test, and wherein the corresponding endpoint returns test data which includes at least one of application traffic monitoring, determining UI response times, examining device logs, and determining resource utilization metrics.

16. The method of claim 11, wherein the one or more operations comprises checking the status of an executed or currently executing performance test, and wherein the corresponding endpoint returns a status indicator.

17. The method of claim 11, further comprising:
having the logic system access a model generated by a machine learning system, the machine learning system using messages exchanged via the centrally integrated chat user interface to build and/or refine the model over time.

18. The method of claim 11, further comprising:
having the logic system access a language server to determine the intent from the updated request.

19. The method of claim 18, further comprising:
having the logic system use the language server to apply a natural language understanding (NLU) process to correlate the updated request to the one or more operations associated with the automated testing.

20. A non-transitory computer readable medium for executing operations in a performance engineering environment, the computer readable medium comprising computer executable instructions for:

receiving via the communications module, a request to implement automated testing within the performance engineering environment, from an input to a centrally integrated chat user interface connected to and between both an application testing environment and an application development environment of the performance engineering environment to coordinate testing operations among disparate systems;

generating and transmitting, via the communications module to the centrally integrated chat user interface, one or more instructional elements that suggest modifications to the request;

receiving, via the communications module, an updated request from another input to the centrally integrated chat user interface;

communicating with a logic system to determine an intent from the updated request;

determining one or more executable instructions to implement one or more operations associated with automated testing, based on the determined intent, wherein the one or more operations of the automated testing are implemented based one or more of the application testing environment and the application development environment;

communicating via the communications module, with at least one endpoint to trigger execution of the one or more operations using the one or more executable instructions;

receiving via the communications module, data from the at least one endpoint, the data associated with execution of the one or more operations;

generating a conversational response to the updated request based on or including the data received from the at least one endpoint; and having the conversational response rendered in the centrally integrated chat user interface.

* * * * *